United States Patent [19]
Bohmer et al.

[11] Patent Number: 6,052,160
[45] Date of Patent: Apr. 18, 2000

[54] DISPLAY DEVICE WITH SPUTTER-RESISTANT ELECTRODE LAYER FOR PROVIDING PLASMA DISCHARGE

[75] Inventors: Marcel R. Bohmer; Monica Scholten; Udo Van Slooten, all of Eindhoven, Netherlands

[73] Assignee: U.S. Philips Corporation, New York, N.Y.

[21] Appl. No.: 09/111,545

[22] Filed: Jul. 8, 1998

[30] Foreign Application Priority Data

Jul. 18, 1997 [EP] European Pat. Off. .............. 97202242

[51] Int. Cl.$^7$ ..................................................... G02F 1/133
[52] U.S. Cl. .............................................. 349/32; 313/583
[58] Field of Search ................................ 349/32; 313/583, 313/587, 518, 633; 345/169.4

[56] References Cited

U.S. PATENT DOCUMENTS 4,599,076  7/1986  Yokono et al. ........................... 445/24
5,783,906  7/1998  Moore et al. ............................ 313/586
5,917,284  6/1999  Moore et al. ............................ 313/586

FOREIGN PATENT DOCUMENTS

0762460A2  3/1997  European Pat. Off. ......... H01J 17/06
0827176A2  3/1998  European Pat. Off. ..

*Primary Examiner*—James A. Dudek
*Attorney, Agent, or Firm*—John C. Fox

[57] ABSTRACT

The display device is furnished with a channel plate (39) comprising channels (30, 30', 30") containing an ionizable gas (33), and the walls of the channels (30, 30', 30") being provided with electrodes (31, 32) for selectively generating a plasma discharge of the ionizable gas (33) during operation. The display device further comprises an electro-optical layer (35) of a material having an optical property which is governed by the discharge state of the plasma discharge. The display device is characterized in that at least one of the electrodes (31, 32) is furnished with a layer (37) comprising particles of a sputter-resistant material having an average diameter $\leq 2.5$ $\mu$m, preferably $\leq 1.5$ $\mu$m. The particles are preferably composed of rare-earth borides (for example $LaB_6$) or ruthenium oxide.

17 Claims, 2 Drawing Sheets

DISPLAY DEVICE WITH SPUTTER-RESISTANT ELECTRODE LAYER FOR PROVIDING PLASMA DISCHARGE

BACKGROUND OF THE INVENTION

The invention relates to a display device comprising at least one compartment containing an ionizable gas, walls of said compartment being provided with electrodes for, in operation, selectively generating a plasma discharge of the ionizable gas, and an electro-optical layer including a material having an optical property which is governed by the discharge state of the plasma discharge.

Display devices for displaying monochromatic or color images include, inter alia, plasma-addressed liquid-crystal display devices, the so-called PALC displays and (direct-current) plasma-display panels (PDPs). The PALC displays and PDPs are applied as television and computer displays and are preferably of the thin type.

A display device of the type mentioned in the opening paragraph is disclosed in European patent application EP-A 0 762 460. The thin-type display device described in said document comprises a display screen with a pattern of (identical) so-called data-storage or display elements and a plurality of compartments. The compartments are filled with an ionizable gas and furnished with electrodes for (selectively) ionizing the ionizable gas during operation. In the known display device, the compartments take the form of mutually parallel, elongated channels (formed in a so-called channel plate), which serve as selection means for the display device (the so-called plasma-addressed row electrodes). By applying a DC voltage difference across the electrodes in one of the channels of the channel plate, electrons are emitted (from the cathode), which ionize the ionizable gas, thereby forming a plasma (plasma-discharge). If the voltage across the electrodes in the one channel is switched off and the gas is de-ionized, a subsequent channel is energized. At the displayscreen side of the display device, the compartments are closed by a (thin) dielectric layer ("microscheet"). The display device further comprises a layer of an electro-optical material provided on a substrate and further electrodes which serve as so-called data electrodes or column electrodes of the display device. The display device is formed by the assembly of the channel plate with the electrodes and the ionizable gas, the dielectric layer, the layer of the electro-optical material and the further electrodes.

In a plasma-display panel, a plasma discharge is used to directly excite a layer containing electroluminescent phosphors of display elements, while (electrons of) the ionized gas in the compartment itself excite(s) the phosphors. In an alternative embodiment of a plasma-display panel, a plasma discharge is used to generate light (for example UV light), said light exciting a layer containing photoluminescent phosphors of display elements.

A drawback of the known display device is that the energy consumption of such display devices is still relatively high.

OBJECTS AND SUMMARY OF THE INVENTION

It is an object of the invention to provide, inter alia, a display device whose energy consumption has been further reduced.

To achieve this, the display device in accordance with the invention is characterized in that at least one of the electrodes is furnished with a layer comprising particles of a sputter-resistant material, said particles having an average diameter below 2.5 $\mu$m.

At the beginning of a plasma-discharge cycle in the display device, a plasma discharge is created in the compartment or in one of the compartments (for example in the channels of a PALC-display panel) by applying a (relatively high) voltage pulse (the so-called "strobe"-pulse) across the electrodes in the compartment. In such a plasma discharge, charged particles are created. The voltage across and the current in the discharge reach a stationary condition (the so-called "steady state") within a few $\mu$s. After switching off the plasma discharge, the grey level of each display element is checked by applying a (relatively low) voltage across the corresponding further electrode (the data electrode or column electrode). As a result, a part of the charged particles is drawn towards the (thin) dielectric layer ("microsheet"), causing the electro-optical layer to be subjected to an electric field. As a result, the electro-optical layer is charged like a capacitor until the full data voltage is present across the layer, consequent upon which the transparency of the electro-optical layer changes (for example, the layer becomes more or less transparent). The degree of transparency, which is an optical property of the electro-optical layer, is determined by the level of the data voltage and hence depends on the discharge state of the plasma discharge. After the discharge has disappeared, in the so-called "afterglow", the compartment forms an insulator and the electro-optical layer remains charged. A new plasma-discharge in the compartment effects a reset or a renewed selection of the display element.

Important parameters of the plasma-discharge cycle of the display device are the electric conductivity of the plasma discharge and the decay of the conductivity in the afterglow period. If the decay in conductivity of the plasma discharge takes too long, the discharge may continue while a subsequent data line is already being written, which is undesirable. Too rapid a decay of the conductivity also has adverse effects.

In general, the display device comprises a number of compartments, each compartment incorporating at least two electrodes for ionizing the gas.

In the case of a plasma-addressed liquid-crystal display device (PALC display), the electro-optical layer of the material having an optical property which is governed by the discharge state of the plasma discharge, comprises a layer of an electrooptical material (for example a liquid-crystal material). Such a display device generally further includes means which are suitable for activating the electro-optical layer. In a PALC display, the ionized gas serves as a virtual switch for the electro-optical material.

In the case of a (direct-current) plasma-display panel (dc PDP), the electro-optical layer of the material having an optical property which is governed by the discharge state of the plasma discharge, comprises so-called electroluminescent or photoluminescent phosphors. In the instance of electroluminescent phosphors, the ionized gas excites the phosphors in the compartment itself, and in the case of photoluminescent phosphors, the ionized gas emits light which causes the phosphors to emit visible light (of the desired color).

As a (dc) plasma discharge is employed in the display device, the electrodes in the compartment are subject to an ion bombardment, and the electrodes, in general, are manufactured from a sputter-resistant material or the electrodes are preferably provided with a sputter-resistant layer. The use of a sputter-resistant material increases the resistance of the electrodes against sputtering. In the known display device, this is achieved by covering the electrodes (by means of electrophoresis) with a coating of a hexaboride and a glass frit.

The inventors have recognized that the energy balance of the display device can be improved by increasing the conductivity of the sputter-resistant particles in the layer. A problem of the known layer deposited on (one of) the electrodes in the compartment of the display device resides in that the conductivity of the sputter-resistant particles in the layer is generally insufficient. Ignition of a plasma in the known display device in which (one of) the electrodes is/are provided with the known layer causes brightly illuminating anode spots.

By providing, in accordance with the invention, at least one of the electrodes with a(n) (electroconductive) layer comprising (microscopic) particles of a sputter-resistant material (refractory material) having an average particle diameter below 2.5 μm, it is achieved, under otherwise equal conditions, that the effective surface of the particles increases (leading to a reduction of the effective work function) as well as the contact surface between the particles, so that charging of the particles is effectively reduced. By virtue of the measure in accordance with the invention, the work function of the layer comprising sputter-resistant particles is reduced and a good electroconductive layer is obtained. An average particle diameter of 2.5 μm is to be taken to mean in this application that $d_{50}$ =2.5 μm, the subscript "50" indicating that 50% by weight of the diameters of the particles is smaller than or equal to said value. In the case of a typical grain size distribution and a value of $d_{50}$ =2.5 μm, the corresponding values for $d_{10}$ and $d_{90}$ are respectively ~1.7 μm and ~3.7 μm, the definitions of $d_{10}$ and $d_{90}$ corresponding to that of $d_{50}$.

In the known display device, the particles used are "typically about 4.0 microns in diameter". Particles of such a size provided by means of electrophoresis exhibit a conductivity which is so low that the addition of a considerable quantity of glass frit is necessary to obtain the desired conductivity. In accordance with the inventive measure, a satisfactorily conducting, sputter-resistant layer can be used which includes more sputter-resistant material. An additional advantage of the omission or reduction of the quantity of glass frit is that such a layer comprising sputter-resistant particles has a high secondary electron-emission coefficient, causing the ignition and sustain voltages and hence the energy consumption of the display device to be reduced.

The above-mentioned anode spots do not occur in a layer provided on the electrodes in the compartment of a display device having a particle diameter in accordance with the invention. In addition, the improved conductivity of the sputter-resistant material enables the electro-optical layer to be better addressed. An additional advantage is that a layer having such a relatively small particle size can also be much thinner. When the electrode is (electrophoretically) covered with such an optically non-transparent layer, said layer also grows partly around the electrode, so that a thinner layer also leads to a lower aperture loss in the display device.

Preferably, the average diameter of the particles is below 1.5 μm. The work function can be further reduced and the conductivity further improved by providing (one of) the electrode(s) with a layer of particles having an average particle diameter ($d_{50}$ ≦1.5 μm).

Particles which can suitably be used to achieve the object of the invention are rare-earth borides, for example $LaB_6$ or $GdB_6$, or ruthenium oxide ($RuO_2$).

In an alternative embodiment in accordance with the invention, a (glass) frit is added to the layer of relatively small particles of a sputter-resistant material applied to (at least one of) the electrodes in the channels of the display device. The adhesion of the layer is improved by adding, during the manufacture of the (coating) layer, a preferably very finely ground glass frit (typical grain size ≦1 μm) to the particles of the sputter-resistant material.

In the known display device, the glass frit is provided between and (partly) on the particles (see FIG. 9 of EP-A 0 762 460) in order to bond the particles together, which leads to a reduction of the active surface of the particles. In the known layer, the frit is employed predominantly to enlarge the contact surface between the particles of the sputter-resistant material. Said frit causes the active surface of the sputter-resistant particles to be reduced. The addition of a (glass) frit in accordance with the inventive measure serves to improve the adhesion of the sputter-resistant particles to the surface of the electrodes and generally does not lead to a reduction of the active surface of the sputter-resistant particles, which would be undesirable in view of the fact that the secondary emission coefficient of the sputter-resistant particles should be as high as possible.

These and other aspects of the invention will be apparent from and elucidated with reference to the embodiments described hereinafter.

BRIEF DESCRIPTION OF THE DRAWINGS

In the drawings.

The Figures are purely schematic and not drawn to scale. In particular for clarity, some dimensions are exaggerated strongly. In the Figures, like reference numerals refer to like parts, whenever possible.

DESCRIPTION OF THE PREFERRED EMBODIMENTS

Figure 1:
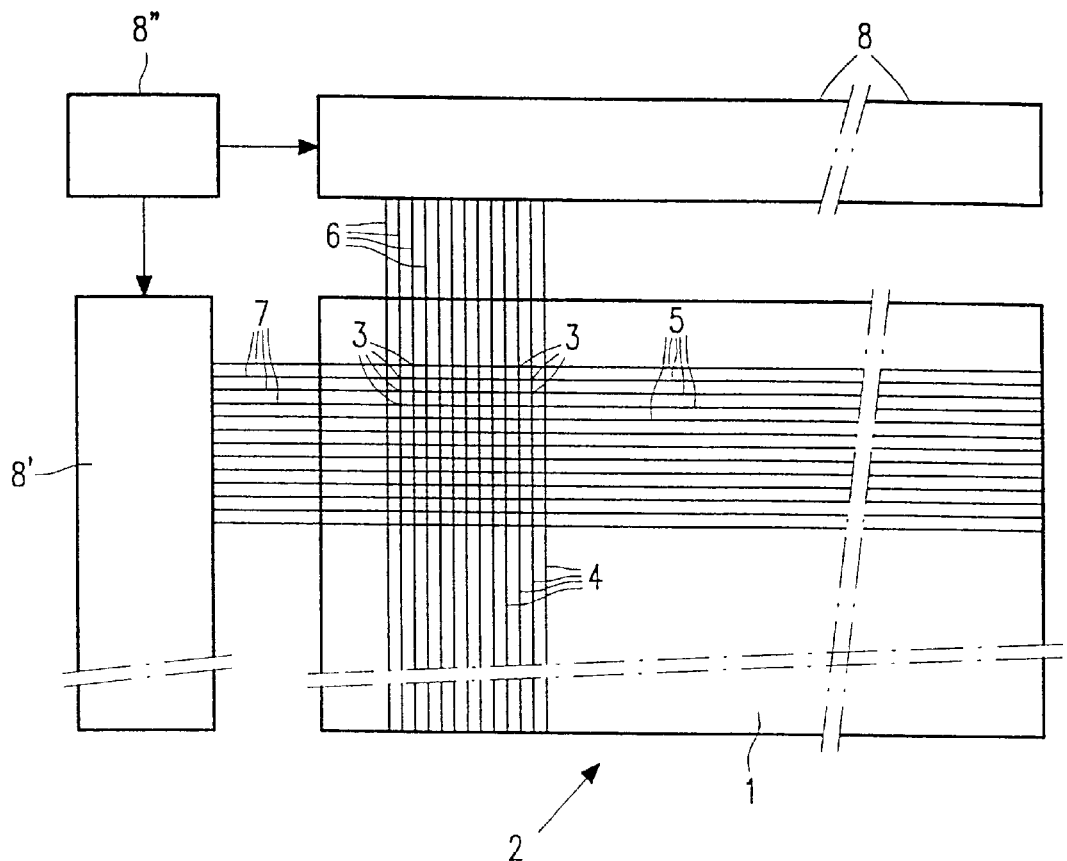
FIG. 1 shows a schematic block diagram of a display device.

FIG. 1 very schematically shows a block diagram of a conventional display evice. Said display device comprises a substrate 1 having a surface 2 provided with a pattern of pixels separated from each other in the vertical and horizontal directions (the space between the pixels being predetermined). Each pixel 3 comprises overlapping portions of (thin, narrow) electrodes 4 of a group of electrodes arranged in vertical columns and (thin, narrow) electrodes 5 of a further group of electrodes arranged in horizontal rows. The electrodes 4 of the group of electrodes are also referred to as column electrodes, and the electrodes 5 of the further group of electrodes are also referred to as row electrodes. In a plasma-addressed liquid-crystal display device (PALC), the rows are formed by long, narrow channels (the compartments). The pixels 3 in each of the rows of electrodes (channels) 5 represent one data line.

The width of the electrodes 4, 5 determines the dimensions of the pixels 3, which are typically rectangular in shape. Electrodes 4 receive (analog) drive signals ("data drive signals") from a drive circuit 8 via parallel conductors 6, and electrodes 5 receive (analog) drive signals ("data drive signals") from a drive circuit 8' via parallel conductors 7.

To produce an image or a data-graphic display on a relevant area of the surface 2 of substrate 1, the display device employs a control circuit 8" ("scan control circuit"), which controls the drive circuits 8, 8'. In the display device, various types of electro-optical materials may be used. Examples of electro-optical materials include (twisted) nematic or ferro-electric liquid-crystal materials. In general, the electro-optical materials weaken the passed or reflected light in dependence upon a voltage applied across the material.

Figure 2:
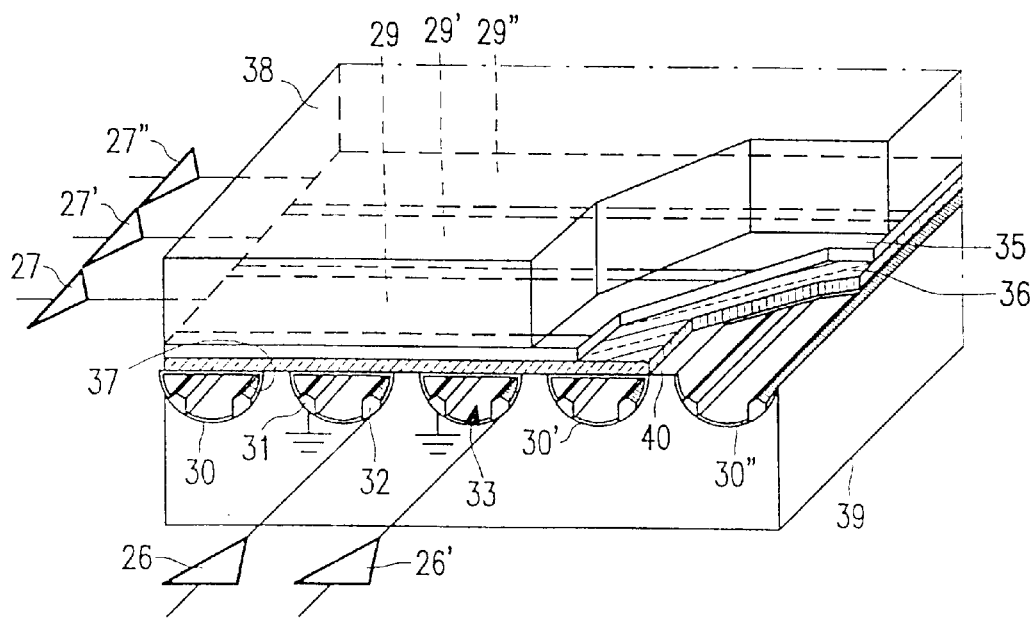
FIG. 2 is a schematic, perspective view, partly cut-away, of a part of a construction of a plasma-addressed liquid-crystal display device (PALC)

FIG. 2 is a schematic, perspective view, partly cut away, of a part of a construction of a plasma-addressed liquid-crystal display device (PALC) comprising a first substrate 38 and a second substrate 39. In FIG. 2, only three column electrodes 29, 29', 29" are shown. The row electrodes 30, 30', 30", which serve as selection means, are formed by a number of mutually parallel, elongated channels (compartments) below an electro-optical layer 35 of an electro-optical material. The panel is provided with electric connections to the column electrodes 29, 29', 29" and to the plasma electrodes 31, 32, said column electrodes 29, 29', 29" receiving (analog) drive signals from output amplifiers 27, 27', 27", and the anode electrodes 32 in the (plasma) channels 30, 30', 30" receiving drive signals from output amplifiers 26, 26'. Each of the (plasma) channels 30, 30', 30" is filled with an ionizable gas 33 and is sealed with a thin dielectric layer ("microsheet") 36 which is made, for example, of glass. Each of the compartments (the channels) is provided at an inner surface (wall) with first and second elongated electrodes 31, 32 extending throughout the length of the channel. The second electrode 32 is referred to as the anode and is supplied with a pulsed voltage, a so-called "strobe pulse", causing electrons emitted from the cathode 31 to ionize the gas, thereby forming a plasma. In an alternative embodiment, a negative (direct-current) pulse is applied to the cathode. The next channel is not energized until after the "strobe pulse" has ended and the gas has been de-ionized. To reduce the duration of the cycle, the next channel is generally ionized already before the preceding channel has been (completely) de-ionized. The column electrodes 29, 29', 29" each cross an entire column of pixels, so that, in order to preclude crosstalk, the number of plasma row connections per unit of time is limited to only one.

In accordance with the invention, at least one of the electrodes 31, 32 is furnished with an (electroconductive) layer 37 of (microscopic) particles of a sputter-resistant material (refractory material) having an average particle diameter below 2.5 $\mu$m ($d_{50} \leq 2.5$ $\mu$m). The layer 37 is preferably provided by means of electrophoresis. By employing particles having an average diameter below 2.5 $\mu$m, the desired conductivity of the conductive layer 37 is achieved without the necessity of adding a glass frit to the layer. By virtue of the absence of the glass frit, such a layer has a higher secondary electron-emission coefficient, which causes the ignition and sustain voltages and hence the energy consumption of the display device to be reduced considerably. In a layer 37 which is applied to the electrodes 31, 32 in the (plasma) channels 30, 30', 30" of the display device and which includes particles having a diameter in accordance with the invention, anode spots do not occur. In addition, the improved conductivity of the sputter-resistant material enables the electro-optical layer to be better addressed. By virtue of the relatively small particles, the layer 37 is generally thinner, resulting in a lower aperture loss in the display device. Preferably, the average diameter of the particles in the layer 37 is below 1.5 $\mu$m ($d_{50} \leq 1.5$ $\mu$m), with $d_{90} \leq 2.4$ $\mu$m. Suitable materials include rare-earth borides, for example $LaB_6$ or $GdB_6$, or ruthenium oxide ($RuO_2$). Other suitable materials include $Cr_3Si$, diamond, diamond-like carbon and barium tantalate ($Ba_4Ta_2O_9$).

Figure 3:
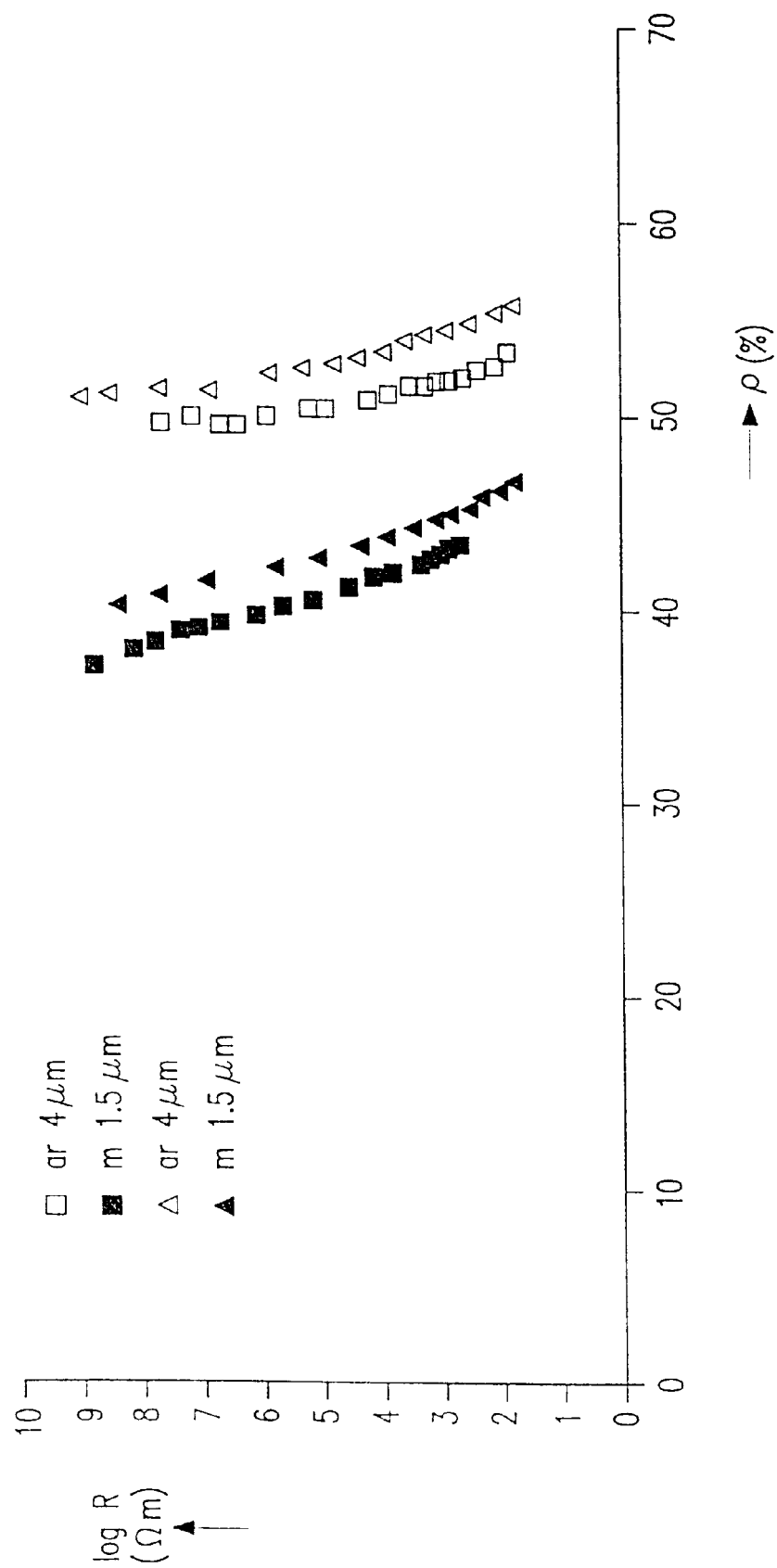
FIG. 3 shows the resistance of $LaB_6$ powder as a function of the relative packing density for different particle sizes.

FIG. 3 shows the resistance (R in $\Omega$m) of various $LaB_6$ powders (in this case, two types of commercially available powders) as a function of the relative packing density ($\rho$ in %) for different particle sizes. The open triangles and open squares show the resistance R of the known $LaB_6$ particles having an average size of 4 $\mu$m (ar="as received"). This powder only becomes conducting at a packing density in excess of 50%. Such a packing density is not achieved in a standard electrophoretic coating process, so that a layer comprising sputter-resistant particles having an average diameter of 4 $\mu$m is not conducting. A layer comprising particles having an average diameter of 4 $\mu$m generally only reaches the desired conductivity by adding an (electroconductive) glass frit to the layer.

In FIG. 3, the closed triangles and closed squares represent the resistance R of the known $LaB_6$ particles having an average size of 1.5 $\mu$m (m="milled"). In this example, such a particle size is obtained by grinding the "as received" $LaB_6$ particles (4 $\mu$m) on a roller machine with 2 mm $Si_3N_4$ balls for 24 hours. The resultant powder ($d_{50}$~1.5 $\mu$m) is conducting already at a packing density above 40%. Such a packing density is readily achieved in a standard electrophoretic coating process, and causes a layer comprising sputter-resistant particles having an average diameter of 1.5 $\mu$m to be electrically conducting. A layer comprising particles having an average diameter of 1.5 $\mu$m, which is applied by means of a standard electrophoretic coating process, has the desired conductivity without a glass frit having been added to the layer. To improve the adhesion of the sputter-resistant particles to the contact surface of the electrode, a relatively thin layer of a glass frit may be added without the active surface of the sputter-resistant particles necessary for an optimum secondary electron emission being effectively reduced.

It will be obvious that, within the scope of the invention, many variations are possible to those skilled in the art.

In general, the invention relates to a display device comprising a channel plate (39) including channels (30, 30', 30") containing an ionizable gas (33), and walls of the channels being provided with electrodes (31, 32) for selectively ionizing the ionizable gas (33), during operation. The display device further comprises an electro-optical layer (35) of a material having an optical property which is governed by the discharge state of the plasma-discharge. The display device is characterized in that at least one of the electrodes is provided with a layer (37) comprising particles of a sputter-resistant material having an average diameter $\leq 2.5$ $\mu$m, preferably $\leq 1.5$ $\mu$m. The particles are preferably composed of rare-earth borides (for example $LaB_6$) or ruthenium oxide.

We claim:

1. A display device comprising
   at least one compartment (30, 30', 30") containing an ionizable gas (33), walls of said compartment (30, 30', 30") being provided with electrodes (31, 32) for, in operation, selectively generating a plasma discharge of the ionizable gas (33),
   and an electro-optical layer (35) including a material having an optical property which is governed by the discharge state of the plasma discharge,
   characterized in that at least one of the electrodes is furnished with a layer (37) comprising particles of a sputter-resistant material, said particles having an average diameter below 2.5 $\mu$m.

2. A display device as claimed in claim 1, characterized in that the average diameter of the particles is below 1.5 μm.

3. A display device as claimed in claim 1, characterized in that the particles are composed of a rare-earth boride or ruthenium oxide.

4. A display device as claimed in claim 3, characterized in that the boride is $LaB_6$.

5. A display device as claimed in claim 1, characterized in that the layer (37) further comprises a frit.

6. A display device as claimed in claim 5, characterized in that the frit is a glass frit.

7. A display device as claimed in claim 1, characterized in that the electro-optical layer (35) comprises a layer (35) of an electro-optical material, and in that the display device is furnished with means which can suitably be used to activate the electro-optical layer (35).

8. A display device as claimed in claim 7, characterized in that the electro-optical material comprises a liquid-crystal material.

9. A display device as claimed in claim 1, characterized in that the material of the electro-optical layer (35) comprises electroluminescent or photoluminescent phosphors.

10. A display device as claimed in claim 2, characterized in that the particles are composed of a rare-earth boride or ruthenium oxide.

11. A display device as claimed in claim 10, characterized in that the boride is $LaB_6$.

12. A display device of claim 10, characterized in that the layer (37) further comprises a glass frit.

13. A display device as claimed in claim 2, characterized in that the electro-optical layer (35) comprises a layer (35) of an electro-optical material, and in that the display device is furnished with means which can suitably be used to activate the electro-optical layer (35).

14. A display device as claimed in claim 13, characterized in that the electro-optical material comprises a liquid-crystal material.

15. A display device as claimed in claim 2, characterized in that the material of the electro-optical layer (35) comprises electroluminescent or photoluminescent phosphors.

16. A display device as claimed in claim 1, characterized in that the layer (37) is free of glass frit.

17. A display device as claimed in claim 2, characterized in that the layer (37) is free of glass frit.

* * * * *